United States Patent
Pollock

(10) Patent No.: US 9,150,772 B2
(45) Date of Patent: Oct. 6, 2015

(54) FLAMELESS HEATING COMPOSITION

(75) Inventor: James Richard Allan Pollock, Reading (GB)

(73) Assignee: Julien Philip Goding, Longwick (GB)

( * ) Notice: Subject to any disclaimer, the term of this patent is extended or adjusted under 35 U.S.C. 154(b) by 148 days.

(21) Appl. No.: 14/054,753

(22) PCT Filed: Apr. 16, 2012

(86) PCT No.: PCT/GB2012/000349
§ 371 (c)(1),
(2), (4) Date: Feb. 27, 2014

(87) PCT Pub. No.: WO2012/140402
PCT Pub. Date: Oct. 18, 2012

(65) Prior Publication Data
US 2014/0314917 A1    Oct. 23, 2014

(30) Foreign Application Priority Data
Apr. 15, 2011    (GB) .................................... 1106457

(51) Int. Cl.
| C09K 5/18 | (2006.01) |
| B65D 81/34 | (2006.01) |
| F23C 99/00 | (2006.01) |
| F24J 1/00 | (2006.01) |

(52) U.S. Cl.
CPC ............... *C09K 5/18* (2013.01); *B65D 81/3484* (2013.01); *F23C 99/00* (2013.01); *F24J 1/00* (2013.01); *F23C 2900/99008* (2013.01); *Y02E 20/346* (2013.01)

(58) Field of Classification Search
CPC ........ C09K 5/18; A47J 36/28; B65D 81/3484
USPC ............................. 126/263.05, 263.07; 44/251
See application file for complete search history.

(56) References Cited

U.S. PATENT DOCUMENTS

2009/0065733 A1* 3/2009 Handa et al. ..................... 252/71
2010/0147282 A1* 6/2010 Urume et al. ............ 126/263.05

FOREIGN PATENT DOCUMENTS

| GB | 2485380 A | 5/2012 |
| JP | 61231352 A | 10/1986 |
| JP | 2000107039 A | 4/2000 |
| JP | 2002017273 A | 1/2002 |
| WO | WO2009003481 A2 | 1/2009 |

* cited by examiner

*Primary Examiner* — Lessanework Seifu
(74) *Attorney, Agent, or Firm* — Galvin Patent Law LLC; Brian R. Galvin

(57) ABSTRACT

The present invention relates to flameless heating apparatus for food products. In particular, the present invention relates to an improved potentially exothermic mixture/blend for such heaters and to a meal package including foods, and heating apparatus. It is known to have food products such as rations for back-packer, adventurers and military forces which comprise hermetically sealed packages of food which can be heated without flame, on demand. Such food products and apparatus are collectively referred to as Meals-Ready-to-Eat ("MRE"). In addition to the above uses, the products can be used as emergency rations for shelters and for heating of non-food products. Currently MRE packages yield hydrogen as a by-product. The present invention seeks to improve the efficiency of the reaction. In accordance with the present invention, there is provided a composition operable to provide thermal output with no or an insignificant production of any flammable gasses.

19 Claims, 3 Drawing Sheets

FLAMELESS HEATING COMPOSITION

FIELD OF THE INVENTION

The present invention relates to a flameless heater and heating apparatus for food products. In particular, but not necessarily restricted thereto, the present invention relates to improved compositions for exothermic mixtures for hot meal packages for consumption typically in an outdoor environment.

BACKGROUND TO THE INVENTION

It is known to have food products such as rations for backpacker, adventurers and military forces, which comprise sealed packages of pre-cooked food. Conveniently, the food is hermetically sealed, within a vacuum; the food can be heated, on demand, since the food will not need to be cooked, as such. Such food products and apparatus are collectively referred to as Meals-Ready-to-Eat ("MRE"). In addition to the above uses, the products can be used as emergency rations for shelters and for heating of non-food products. Whilst meals, ready-to-eat are used extensively in the military as a method of providing meals to soldiers while in the field, they are also finding their way into use by others, such as campers, boaters, and disaster response teams.

Typically meals ready to eat food sachets are provided on a personal basis, since heat transfer issues may arise in larger packages. Food is heated to a sufficient temperature—around 70° C. or more—to make it a more pleasurable experience, compared with eating such food cold, which can incidentally, be done. Furthermore, there is a danger of burning when the outer wall of the exothermic material storage portion is not sufficiently thermally insulated. Accordingly such foods are typically prepared by heating with flameless heaters, using exothermic chemical reactions.

In one known type of flameless ration heater, an exothermic reaction is provided by calcium carbonate, sodium carbonate, calcium oxide and aluminium powder mixture can be employed. In another type of flameless ration heater, readily oxidized metals such as magnesium which is activated by adding water and is contained within a pouch. The iron plays a catalytic role in the heater mix; salt can be added to facilitate the reaction. To activate the reaction, in either case, an amount of water is added.

To heat an MRE meal, an emergency services personnel/explorer/soldier simply inserts the heater and the MRE pouch back in to a bag provided with the heater, adds a required amount of water into the bag in and, a short time later, dinner can be served—typically from the same container in which the product was heated!

As can be seen, both types of known heater generate hydrogen as a by-product, which is undesirable in view of the tendency of hydrogen to cause explosions and burn as a visible flame. Recently, there have been made attempts to reduce or ameliorate the production of hydrogen.

WO2009003481 (Moeller) teaches of a catalytic heating system comprising a main catalyst for flameless catalytic burning of fuel gas and a triggering system for initiating the catalytic burning, the triggering system comprising an electrical power source, but this is not suitable for MRE applications, with temperatures in excess of 300° C. being achieved. Moreover, it would appear problems associated with hydrogen are replaced by problems associated with fuel gas.

Generally, the compositions for heaters as presently known comprise mixtures of powdered substances that are activated by the addition of water whereby to produce heat. These known devices all involve the principle of hydrolytic oxidation of a reactive metal to provide heat; the reactive metal is commonly aluminium with alkaline media, or magnesium, used with a copper alloy and electrolytic solutions. In each of these types of heating units, there is an incidental production of a molar equivalent of hydrogen from the metal. In view of the risk of the hydrogen burning explosively, this by-product is unwanted.

OBJECT OF THE INVENTION

The present invention seeks to provide a solution to the above problems. The present invention seeks to provide an improved flameless heater and an improved heater operable to provide a controlled exothermic reaction upon the addition of water with a reduction in the emission of emission of hydrogen. The present invention further seeks to provide, specifically, an improved heater operable to provide a controlled exothermic reaction upon the addition of water with substantially no emission of hydrogen gas.

SUMMARY OF THE INVENTION

In accordance with a first aspect of the invention, there is provided a heat source, suitable for a meal-ready-to-eat package, wherein the heat source comprises a substantially dry powdered composition of an alkaline earth peroxide, an alkali carbonate and a reducing agent; wherein, in the presence of water, the alkaline earth peroxide and the alkali carbonate produce peroxide in solution which reacts with the reducing agent to provide thermal energy as a reaction product.

Applicants have determined first and second systems which, utilising the same oxidation process and dependent upon the class of chemical product, can eliminate or substantially reduce the production of hydrogen. In contrast, prior systems have generated in substantial quantities.

Essentially, upon the addition of water to the peroxide and carbonate a solution is formed which reacts with the reducing agent whereby the reducing agent is oxidised in an exothermic reaction. The peroxide and carbonate in solution have proven to significantly reduce the emission of hydrogen, relative to prior compositions suitable for, inter alia, MRE packages, whereby to overcome a significant disadvantage of prior red-ox heating compositions.

Conveniently, the alkaline earth peroxide is calcium peroxide. The calcium peroxide can be provided as a mixture with calcium hydroxide and an acid wherein the amount of acid is equivalent in molar terms to the calcium hydroxide. The acid can be selected from the group comprising oxalic acid, citric acid and malic acid. The acid can comprise succinic acid. The alkali carbonate can be sodium carbonate. Conveniently, the reducing agent is provided as a powdered composition. The reducing agent can comprises aluminium. The reducing agent can include aluminium compound with a chemical structure containing a sulphur atom. Alternatively, the reducing agent can comprise sodium metabisulphite or ascorbic acid.

Conveniently, the alkaline earth peroxide is calcium peroxide, which has widespread applications and is readily commercially available. Conveniently, the alkali carbonate is sodium carbonate. This alkali salt has widespread applications and is readily commercially available. Conveniently, the reducing agent is a metal. Preferably, the metal reducing agent is aluminium whereby to produce heat and the respective aluminate. In the case of the reducing agent being powdered aluminium and the alkali carbonate being sodium carbonate, the reaction is as follows:

$$3CaO_2+3Na_2CO_3+2Al=3CaCO_3+2NaAlO_2+4NaOH$$

Commercially available calcium peroxide will often contain calcium hydroxide. In such circumstances, it has been found that the addition to the mixture of powdered solids of an amount of oxalic acid that is equivalent in molar terms to the quantity of calcium hydroxide present will mitigate the effects of the presence of calcium hydroxide which would otherwise increase any emission of hydrogen.

In accordance with another aspect of the invention there is provided a meal-ready-to-eat package wherein the active composition utilises porous bags, conveniently made from woven or non-woven fibres, into which are placed powders as described in accordance with the first aspect of the invention. The heat source can be conveniently packaged with the powders contained so that it can be used for personal heating applications, such as in warming foods and in meals ready to eat applications. The heat source components can be provided as mixed powdered composition and the principal powdered compositions are in approximately equal molar proportions. The heat source components can be provided as powdered compositions packaged with the powders separately contained; the separate powders being permitted to mix upon addition of the water.

An advantage of the present invention is that in use, for example in MRE applications, the diminution of formation of hydrogen gas production greatly increases safety. Indeed, the absence of an inflammable gas is generally appreciated in military operations, especially with the proximity of munitions.

By the provision of the present compositions, the problems associated with the production of hydrogen gas are removed or substantially eliminated.

BRIEF DESCRIPTION OF THE FIGURES

Some preferred embodiments of the invention will now be described, by way of example, with reference to the accompanying drawings, of which.

DETAILED DESCRIPTION OF THE PREFERRED EMBODIMENTS

Figure 1:
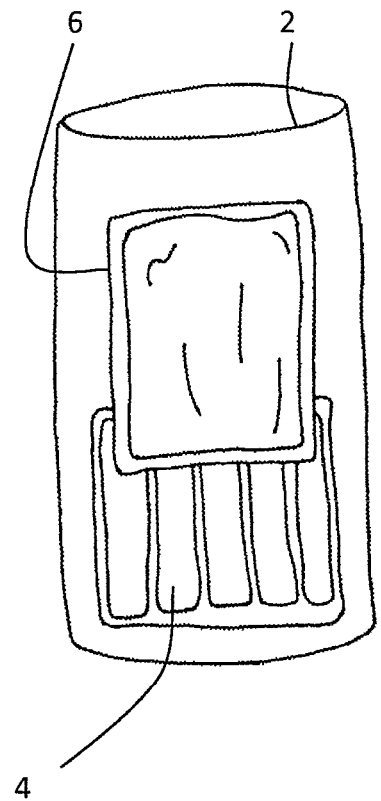
FIG. 1 shows an embodiment of a meal-ready-to-eat package.
Figure 2:
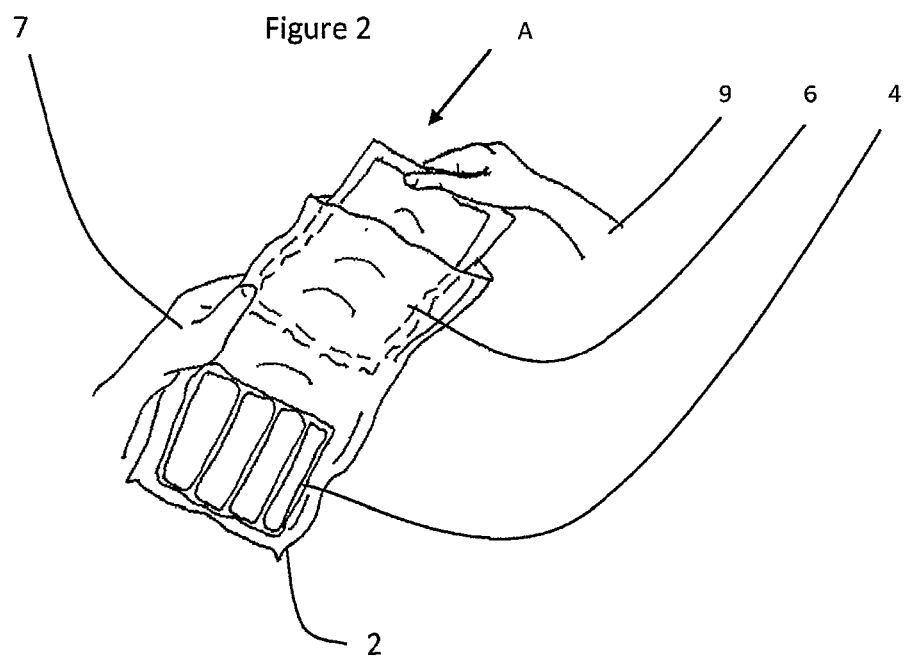
FIGS. 2-6 show the various stages in the preparation of a meal in accordance with a meal-ready-to-eat package instructions.

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Specifically, suitable oxidising agents have been found to be peroxide ions. The peroxide powdered composition can comprise a mixture of sodium percarbonate and calcium oxide. Calcium peroxide can be employed as a peroxide source, with powdered aluminium being used as a reducing agent; in the presence of sodium carbonate, when water is added to the mixture, the calcium peroxide is converted into water-insoluble calcium carbonate and water-soluble sodium peroxide, the reaction with aluminium powder being exothermic.

Conveniently, the components calcium peroxide and aluminium are each provided as powdered solids which are mixed and placed in a porous bag. Should there be any calcium hydroxide present in the calcium peroxide mixture, then the effect of calcium hydroxide can be countered by the addition of substances capable of converting the calcium hydroxide into insoluble calcium salts and water. For this purpose, succinic or oxalic acid is conveniently added in an amount equal on a molar basis to the calcium hydroxide present.

The reaction has been shown to produce significantly reduced levels of hydrogen gas as a by-product, given that the overall reaction can be represented by the following equation:

$$3AEO_2+3A_2CO_3+2R+2H_2O=3AECO_3+2ARO_2+4AOH$$

where:
AE denotes an alkaline earth;
A denotes an alkali carbonate;
R a reducing agent; and,
$AECO_3$ is water insoluble.

Essentially, upon the addition of water to the peroxide and carbonate a solution is formed which reacts with the reducing agent whereby the reducing agent is oxidised in an exothermic reaction. Conveniently, the metal reducing agent is aluminium whereby to produce heat and the respective aluminate. Specifically, in the case of calcium peroxide and sodium carbonate in the presence of aluminium, all conveniently provided as powders, then the overall reaction will be:

$$3CaO_2+3Na_2CO_3+2Al+2H_2O=3CaCO_3+2NaAlO_2+4NaOH$$

It is noticeable that the reactions in accordance with the invention produce no hydrogen or at least substantially reduced amounts of hydrogen, which is a distinct advantage, especially, for example, in many MRE applications, especially military applications.

As will be appreciated in each of the above two embodiments, 30-70 g, more typically 40-60 g, of the powdered solids mixture can be placed in small water-porous reaction bags conveniently made from non-woven or woven fibre, ideally fabricated so that it does not disintegrate in use. A reaction bag can typically be produced from a rectangular sheet of such fibrous material arranged in a two-ply fashion, say of 10 cm×20 cm, whereby to define a bag, conveniently divided into a number of smaller pockets, the two sides of the material being stitched, heat treated, glued or otherwise fastened together.

The powders can conveniently be packaged in packages or sachets of permeable material such as are disclosed in FR1603429 to B Veragano. This document teaches of a number of various types of material, which include paper (of the type used for teabags) and of other natural or artificial textile materials.

Applicants have performed a number of tests on several compositions, as will now be discussed in detail. In order to test the generation of heat, a sufficient weight of the well-mixed powder under test was placed in a 3-cell sachet made of woven oxidation-resistant material. The sachet was first placed in a first, plastics bag into which was placed a sealed plastic pouch containing 300 ml of water, to represent a meal package as known from meals-ready-to-eat. Subsequent to this, water in the amount of 45 ml was added to the first plastics bag and the temperature of the 300 ml of water was monitored and the time from addition of the 45 ml of water was recorded.

In each of the tests performed, the mixtures were present as finely divided powders the amount of water added being sufficient to allow thermal currents arising from the reaction to enable the water in the 300 ml bag, representing the meal, to be uniformly heated.

Example 1

Prior Art

Composition: calcium oxide (14 g); sodium carbonate (20 g), and; aluminium powder (10 g)

Temperature of 80° C. achieved in 12 minutes together with an evolution of 9.7 liters of hydrogen gas.

As can be seen, this type of known heater generates hydrogen as a significant by-product, which is undesirable in view of the tendency of hydrogen to cause explosions. With regard to military use, the fact that hydrogen burns as a visible flame would enable an enemy to quickly visibly locate a position of personnel consuming MRE packages and having an accident in the process.

Example 2

Present Invention

Composition: calcium peroxide (14 g); sodium carbonate (20 g), and; aluminium powder (10 g).

Temperature of 83° C. achieved in 12 minutes together with an evolution of 4.8 liters of hydrogen gas.

Calcium peroxide ($CaO_2$) is a solid peroxide having a white appearance and for most practical purposes is insoluble in water but will dissolve in acid to form hydrogen peroxide. Calcium peroxide is a preferred oxidising agent since it is widely commercially available, as a bleaching agent.

Example 3

Present Invention

Composition: calcium peroxide (25 g); succinic acid (20 g), and; sodium metabisulphite (20 g).

Temperature of 75° C. achieved in 13 minutes together with no evolution of hydrogen gas.

Succinic add is widely used within the food and beverage industry. It has been found that similar acids such as citric, malic and oxalic acid can conveniently replace succinic acid to provide suitable degrees of heating for meals-ready-to-eat applications.

Sodium metabisulphite (or pyrosulphate) is an inorganic compound of chemical formula $Na_2S_2O_5$ and is sometimes referred to as disodium (metabisulphite). It is widely employed as a preservative agent and is also widely available at a reasonable cost. It has also been found that sodium metabisulphite can be replaced with ascorbic acid. As will be appreciated, there are other compounds of the same compound families that will exhibit similar properties.

The present invention can conveniently be described with reference to a flameless heater for food, with reference to FIGS. 1-6, following a simple explanation of the overall processes involved. Generally, the invention resides in the provision of a reactive solution, such as a peroxide, in aqueous solution, which peroxide is capable of reacting with a metal whereby to provide an oxide of the metal and the liberation of heat in a strongly exothermic reaction. Previous attempts to generate heat for heating units suitable for personal warming devices and suitable for meals-ready-to-eat packages have liberated hydrogen, which, instead of being combined simultaneously or subsequently to production is, released. In a preferred reaction, with the use of, for example, a powdered composition of calcium peroxide and sodium carbonate, a peroxide solution is provided upon the addition of water. Subsequently the peroxide solution reacts with a powdered metal such as aluminium, whereby to provide thermal energy and water as further reaction products.

FIG. 1 shows a sealed pack comprising an exemplary heater bag, which is conveniently a generally elongate plastic bag, extending more in length than it does in width: it has been found that dimension of 10 cm×20 cm are convenient for many food applications, although it will be appreciated that this size is not the only size which is suitable. Conveniently the potentially exothermic reaction mixture is provided in reaction bags 4, which bags are somewhat analogous to tea bags, whereby water that is present in the heater bag can percolate through the reaction bags relatively freely. Conveniently, there are sufficient reaction bags so as to lie against each side of a sealed food bag 6 placed inside the heater bag should be retained within outer plastic bag 2 for a predetermined period, whereby to maximise the transfer of heat.

Figure 3:
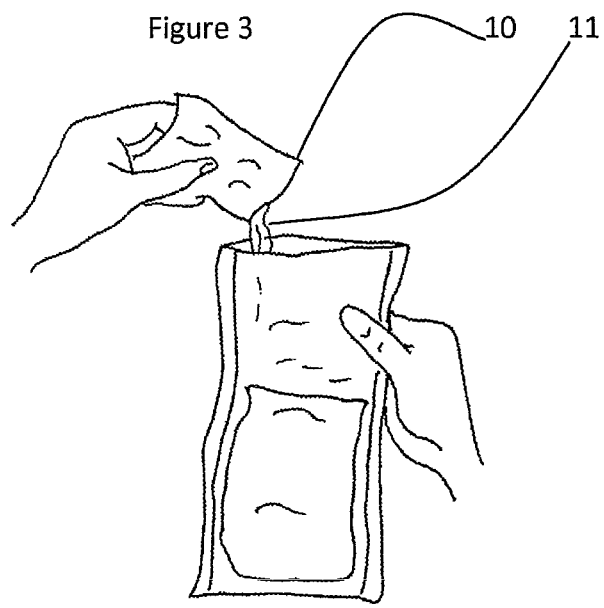
Figure 4:
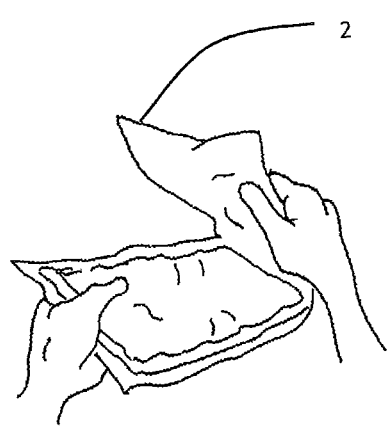
Figure 5:
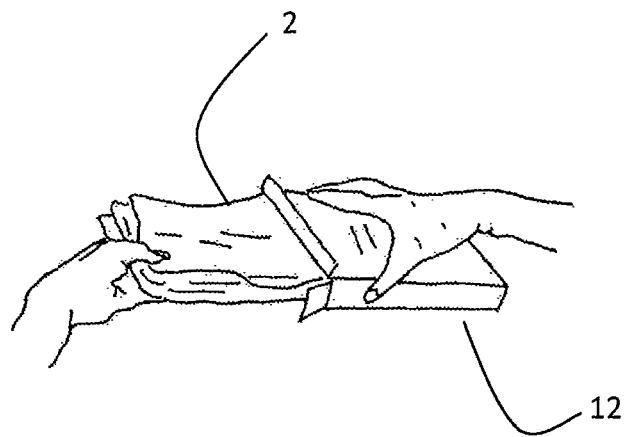
Figure 6:
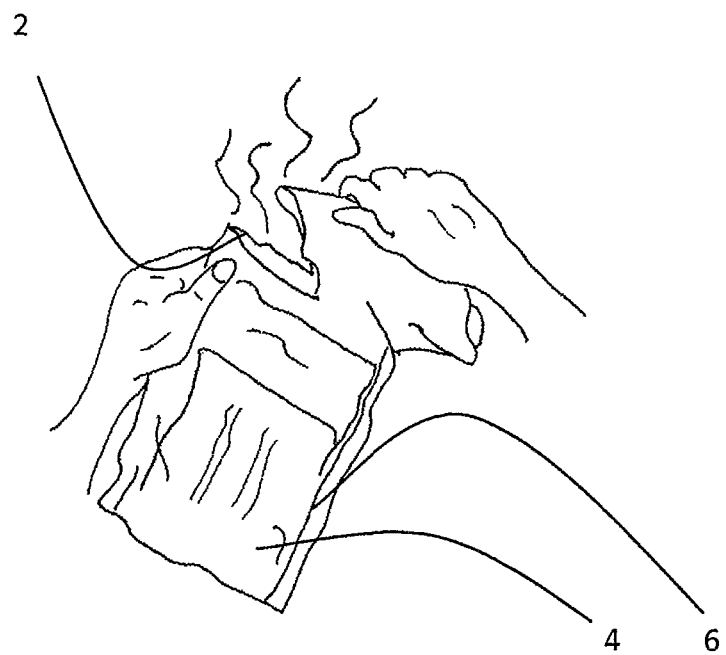

In use, the sealed pack is opened along one short edge: a sealed packet of re-heatable food 6 is inserted into the bag (FIG. 2); water from a measurement beaker 10 is added to the mixture of a predefined amount: conveniently this is about 45 ml, but obviously depends upon the amount of powdered composition (FIG. 3). The bag is approximately just over twice the length of the packet of food; the remainder of the plastic bag is folded over so as to assist in retaining heat developed within the bag (FIG. 4). Heat retention may be further assisted by placement within a further bag or envelope 12 (FIG. 5). Many meals are ready after having been heated for a period of 10-12 minutes. This period of time will typically be the same in a range of food products to ensure that foods are properly heated by prior, hydrogen emitting systems—otherwise overcooking and undercooking of products will result, sometimes with dietary problems arising, so uniformity of cooking periods is preferable. Once ready, the bag can be torn along a predefined line (FIG. 6) or the bag may be inverted to allow the food bag to slip out through the opening of the bag, taking into account that the bag may distort to a certain extent due to heat generation.

It is to be understood that the present invention is not restricted to meals-ready-to-eat since the term MRE is generally employed in relation to specific types of heating food in certain types of food heating packages. Equally, it is possible to use the present invention in larger prepared food arrangements, suitable for providing heat whereby to cook food and for meals other than for one person. It is noted, however, that many foods for outdoor use are already cooked and merely require heating—that is to say the temperature achieved in heating is not critical, for example when re-heating food that has already been cooked.

What is claimed is:

1. A heat source, suitable for a meal-ready-to-eat package, wherein the heat source comprises a substantially dry powdered composition of an alkaline earth peroxide, an alkali carbonate and a reducing agent; wherein, in the presence of water, the alkaline earth peroxide and the alkali carbonate produce peroxide in solution which reacts with the reducing agent to provide thermal energy as a reaction product.

2. A heat source according to claim 1, wherein the alkaline earth peroxide is calcium peroxide.

3. A heat source according claim 1, wherein the alkaline earth peroxide is calcium peroxide and wherein the calcium peroxide is provided as a mixture with calcium hydroxide and an acid wherein the amount of acid is equivalent in molar terms to the calcium hydroxide.

4. A heat source according to claim 1, wherein the alkaline earth peroxide is calcium peroxide and wherein the calcium peroxide is provided as a mixture with calcium hydroxide and an acid wherein the amount of acid is equivalent in molar terms to the calcium hydroxide, wherein the acid is succinic acid.

5. A heat source according to claim 3, wherein the acid is selected from the group comprising oxalic acid, citric acid and malic acid.

6. A heat source according to claim 1, wherein the alkali carbonate is sodium carbonate.

7. A heat source according to claim 1, wherein the reducing agent is provided as a powdered composition.

8. A heat source according to claim 1, wherein the reducing agent comprises aluminum.

9. A heat source according to claim 1, wherein the reducing agent includes aluminum.

10. A heat source according to claim 1, wherein the reducing agent includes aluminum, wherein the chemical structure of the reducing agent contains a sulphur atom.

11. A heat source according to claim 1, wherein the reducing agent includes sodium metabisulphite.

12. A heat source according to claim 1, wherein the reducing agent includes ascorbic acid.

13. A heat source according to claim 1, wherein the heat source components are provided as mixed powdered composition and the principal powdered compositions are in approximately equal molar proportions.

14. A heat source according to claim 1, wherein the heat source components are provided as powdered compositions packaged with the powders separately contained.

15. A heat source according to claim 1, wherein the heat source components are provided as powdered compositions packaged with the powders separately contained, wherein the separate powders are permitted to mix upon addition of the water.

16. A meal-ready-to-eat package wherein the active composition utilizes porous fiber bags into which are placed a substantially dry powdered composition of an alkaline earth peroxide, an alkali carbonate and a reducing agent; wherein, in the presence of water, the alkaline earth peroxide and the alkali carbonate produce peroxide in solution which reacts with the reducing agent to provide thermal energy as a reaction product.

17. A heat source according to claim 16, wherein the alkaline earth peroxide is calcium peroxide.

18. A heat source according claim 16, wherein the alkaline earth peroxide is calcium peroxide and wherein the calcium peroxide is provided as a mixture with calcium hydroxide and an acid wherein the amount of acid is equivalent in molar terms to the calcium hydroxide.

19. A heat source according to claim 16, wherein the alkaline earth peroxide is calcium peroxide and wherein the calcium peroxide is provided as a mixture with calcium hydroxide and an acid wherein the amount of acid is equivalent in molar terms to the calcium hydroxide, wherein the acid is succinic acid.

* * * * *